United States Patent [19]
Horiuchi et al.

[11] Patent Number: 5,788,747
[45] Date of Patent: Aug. 4, 1998

[54] EXHAUST SYSTEM FOR FILM FORMING APPARATUS

[75] Inventors: Takashi Horiuchi; Sensho Kobayashi; Masahide Itoh, all of Yamanashi-ken; Hisashi Gomi, Nirasaki, all of Japan

[73] Assignee: Tokyo Electron Limited, Tokyo, Japan

[21] Appl. No.: 788,702

[22] Filed: Jan. 24, 1997

[30] Foreign Application Priority Data

Jan. 24, 1996 [JP] Japan ................... 8-030059

[51] Int. Cl.$^6$ ................................. B01D 50/00
[52] U.S. Cl. ............... 95/288; 55/267; 55/385.1; 118/58; 118/61; 118/723 VE; 427/250; 427/350; 438/681; 438/905; 438/909
[58] Field of Search ............. 55/267, 268, 269, 55/383.1, 385.2, DIG. 18; 95/273, 288, 289; 96/108; 438/909, 905, 688, 680, 681; 454/187; 427/398.4, 398.5, 350, 250, 248.1; 118/723 VE, 715, 50, 61, 58; 431/51; 422/168, 173; 423/210, 245.3, 243.1

[56] References Cited

U.S. PATENT DOCUMENTS

| | | | |
|---|---|---|---|
| 3,669,724 | 6/1972 | Brand | 438/681 |
| 4,519,999 | 5/1985 | Coleman et al. | 95/214 |
| 4,608,271 | 8/1986 | Hieber et al. | 438/680 |
| 4,612,174 | 9/1986 | Fabian et al. | 423/240 R |
| 4,623,524 | 11/1986 | Someya et al. | 423/245.3 |
| 4,784,837 | 11/1988 | Kitayama et al. | 43/240 R |
| 4,966,611 | 10/1990 | Schumacher et al. | 55/270 |
| 5,062,271 | 11/1991 | Okumura et al. | 55/269 |
| 5,183,646 | 2/1993 | Anderson et al. | 423/245.3 |
| 5,227,334 | 7/1993 | Sandhu | 438/681 |
| 5,246,881 | 9/1993 | Sandhu et al. | 438/681 |
| 5,320,817 | 6/1994 | Hardwick et al. | 423/240 R |
| 5,426,944 | 6/1995 | Li et al. | 423/240 R |
| 5,460,636 | 10/1995 | Harada et al. | 55/467 |
| 5,551,965 | 9/1996 | Takahashi | 95/226 |
| 5,584,963 | 12/1996 | Takahashi | 438/905 |
| 5,603,905 | 2/1997 | Bartz et al. | 422/198 |

FOREIGN PATENT DOCUMENTS

| | | |
|---|---|---|
| 3-237714 | 10/1991 | Japan. |
| 4-121468 | 4/1992 | Japan. |
| 7-66171 | 3/1995 | Japan. |

*Primary Examiner*—Duane S. Smith
*Attorney, Agent, or Firm*—Oblon, Spivak, McClelland, Maier & Neustadt, P.C.

[57] ABSTRACT

An exhaust system for a film forming apparatus including an exhaust pipe passage connected to an exhaust port of the film forming apparatus for forming a film on an object by using vaporized gas of an organic metal compound. The film forming apparatus includes a pressure transfer unit provided for the exhaust pipe passage and arranged to transfer, through the exhaust pipe passage, gas in the film forming apparatus as exhaust gas. A cooling mechanism is provided for the pressure transfer unit and arranged to cool the pressure transfer unit to a temperature lower than a temperature, at which the organic metal compound is decomposed, so as to prevent precipitation of the organic metal compound contained in the exhaust gas introduced into the pressure transfer unit. A removing unit is disposed at an intermediate position of the exhaust pipe passage, downstream from the pressure transfer unit, so as to remove the organic metal compound contained in the exhaust gas which is introduced through the exhaust pipe passage.

18 Claims, 4 Drawing Sheets

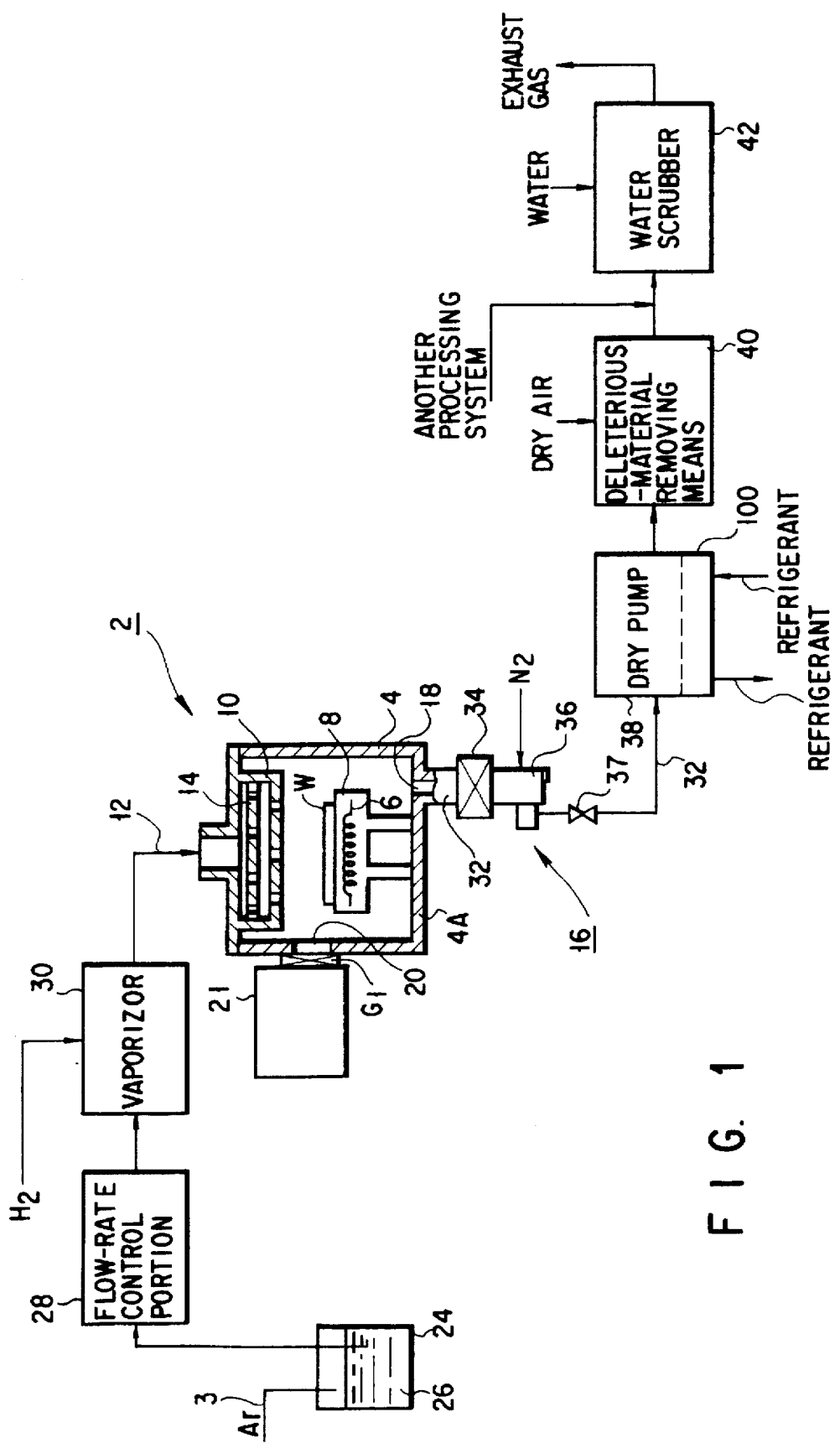
F I G. 1

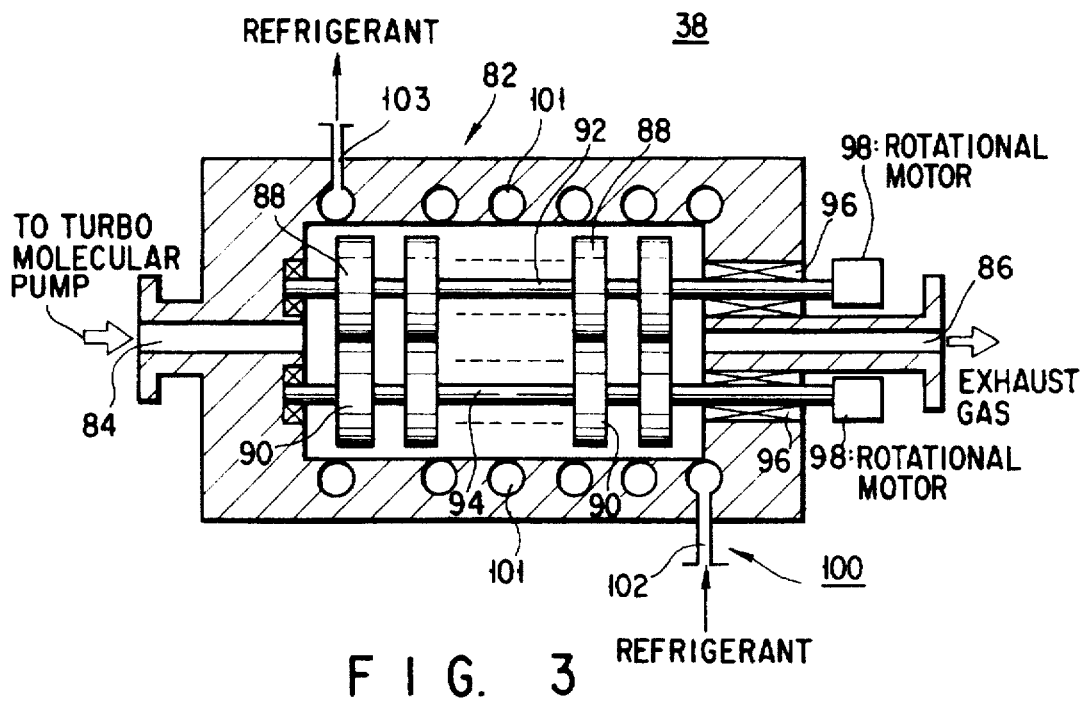
F I G. 3
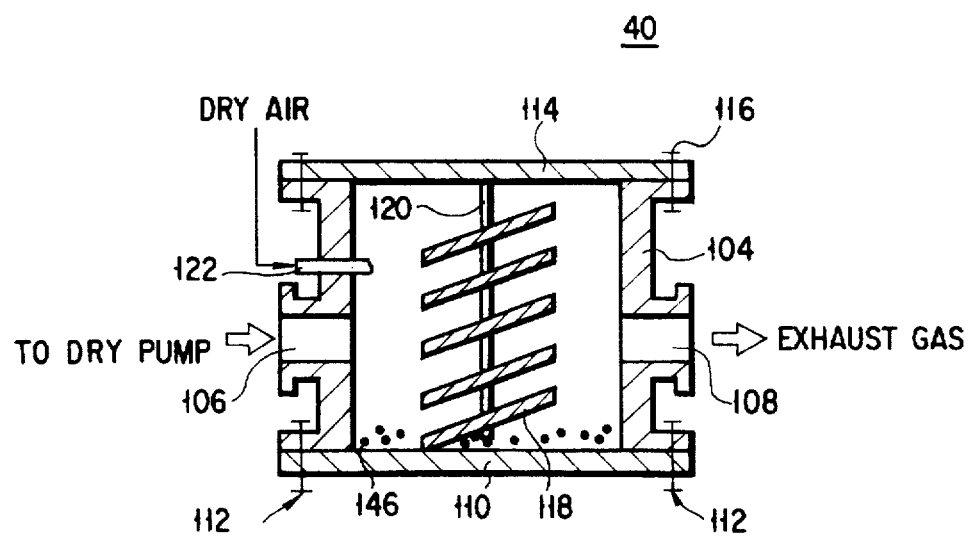
F I G. 4

EXHAUST SYSTEM FOR FILM FORMING APPARATUS

BACKGROUND OF THE INVENTION

The present invention relates to an exhaust system for a film forming apparatus for forming a film on a object, such as a semiconductor wafer, by using an organic metal material.

In general, semiconductor devices are in a trend of having a multi-layer circuit structure to satisfy requirements for realizing high density mounting and raising the degree of integration. When the multi-layer circuit structure is manufactured, techniques for filling a contact hole for establishing the connection between lower devices and an upper aluminum circuit and a via hole for establishing the connection between the lower aluminum circuit and an upper aluminum circuit are important factors in order to establish the electrical connection between the circuit and the devices or between the circuits.

It is preferable that the contact hole and the via hole be filled by using a low cost material, such as aluminum, having excellent electrical conductivity. Moreover, a technical limit placed due to filling the holes raises a requirement for forming the film by CVD (Chemical Vapor Deposition) exhibiting excellent step coverage in place of forming the film by a sputtering method exhibiting significant directional properties in order to prevent voids.

When an aluminum film is formed on a semiconductor wafer by the CVD, DMAH (dimethylaluminum hydride), which is metal organic gas, is generally employed as a processing gas. Since the DMAH has a considerably high viscosity of 8,000 cp (centipoise) to 10,000 cp at room temperature and vigorously reacts with water and oxygen in the air and therefore fires, the DMAH is a material which cannot easily be treated. In addition to the vigorous reaction with water and oxygen, the DMAH is naturally slightly decomposed, and more particularly it is rapidly decomposed at 100° C. or higher to precipitate metal aluminum.

Non-reacted portion of DMAH among the DMAH used in the film forming process and reactants are exhausted from the film forming chamber through an exhaust pipe passage and thereafter they have been heated or cooled by a heating means or a cooling means disposed at an intermediate position of the exhaust pipe passage so as to be precipitated and trapped. In this case, any oil type pump is not used when the non-reacted DMAH and the reactants are discharged through the exhaust pipe passage. To perform the discharging operation, a dry pump serving as a major vacuum pump and a turbo molecular pump for realizing a precise vacuum pressure level are employed such that the two types of the pumps are combined with each other. The reason for this is that use of the oil type pump results in the organic metal material being dissolved in the oil.

When the dry pump and the turbo molecular pump are operated, portions of the pumps, in which heat can easily be generated, for example, a bearing portion and a downstream portion in the dry pump in which the pressure of the exhausting pressure is raised, are heated to temperatures not lower than 100° C. Therefore, the DMAH is, in the above-mentioned portions, decomposed by heat and therefore aluminum is precipitated. Precipitated aluminum is allowed to adhere to the inside portions of the pumps, thus resulting in that the performance of each pump deteriorates. If the worst comes to the worst, the pump can be broken.

BRIEF SUMMARY OF THE INVENTION

An object of the present invention is to provide an exhaust system for a film forming apparatus which is capable of exhausting a non-reacted organic metal material while preventing decomposition of the same occurring in a pump and capable of removing the organic metal material in a downstream portion of the pump.

The object of the present invention can be achieved by the following exhaust system. That is, according to one aspect of the present invention, there is provided an exhaust system for a film forming apparatus comprising: an exhaust pipe passage connected to an exhaust port of the film forming apparatus for forming a film on a object by using vaporized gas of an organic metal compound; pressure transfer means provided for the exhaust pipe passage and arranged to transfer, through the exhaust pipe passage, gas in the film forming apparatus as exhaust gas; cooling means provided for the pressure transfer means and arranged to cool the pressure transfer means to a temperature lower than a temperature, at which the organic metal compound is decomposed, so as to prevent precipitation of the organic metal compound contained in the exhaust gas introduced into the pressure transfer means; and deleterious-material removing means disposed at an intermediate position of the exhaust pipe passage downstream from the pressure transfer means so as to remove the organic metal compound contained in the exhaust gas which is introduced through the exhaust pipe passage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic view showing the structure of a film forming apparatus having an exhaust system according to an embodiment of the present invention;

FIG. 3 is a cross sectional view schematically showing a dry pump forming the exhaust system shown in FIG. 1;

FIG. 4 is a cross sectional view schematically showing a deleterious-material removing means forming the exhaust system shown in FIG. 1;

DETAILED DESCRIPTION OF THE INVENTION

Figure 2:
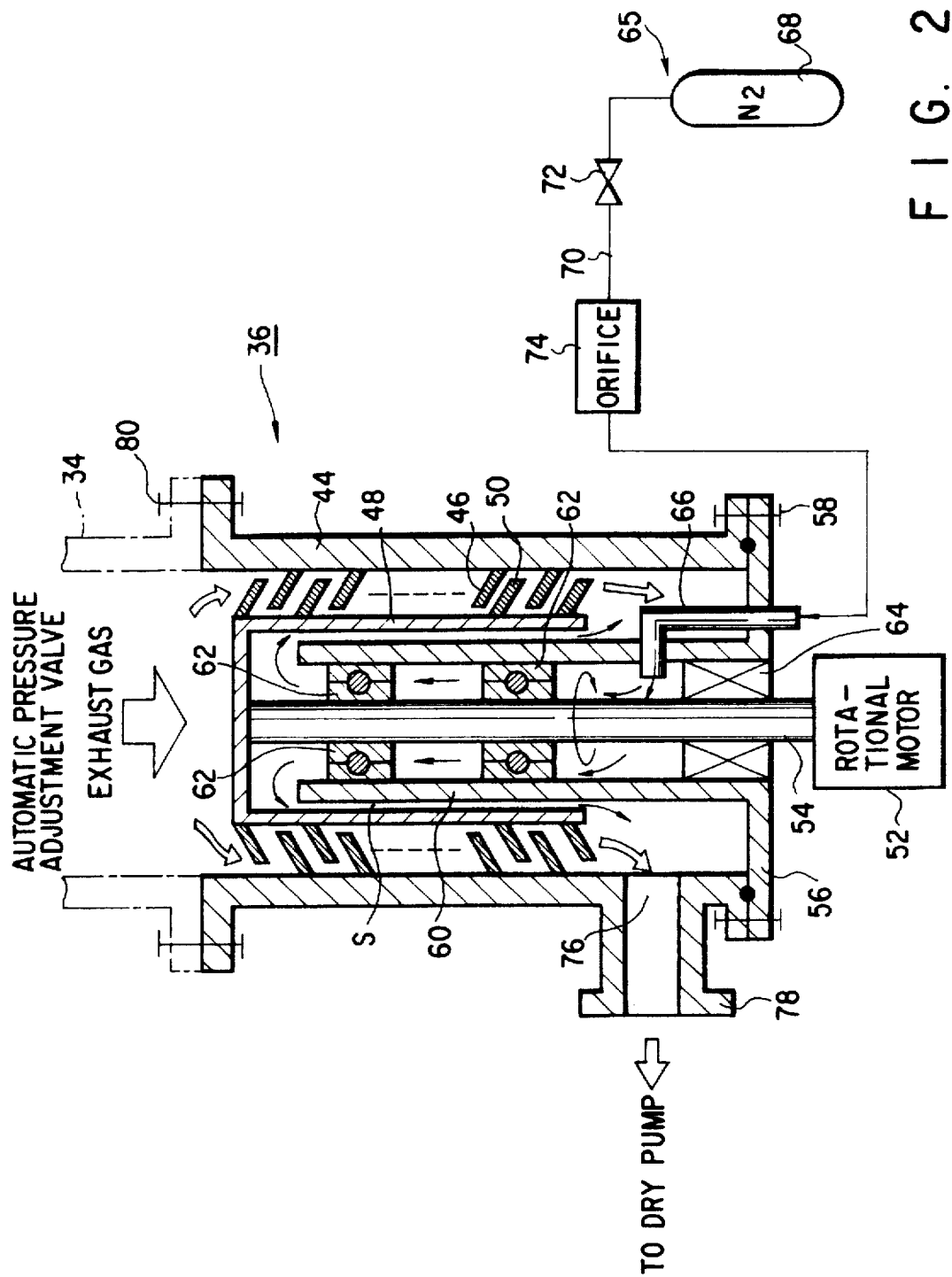
FIG. 2 is a cross sectional view schematically showing a turbo molecular pump forming the exhaust system shown in FIG. 1.

Referring to the drawings, an embodiment of the present invention will now be described.

FIG. 1 shows a film forming apparatus 2 for forming an aluminum film on a semiconductor wafer W by using DMAH (dimethyl aluminum hydride) as an organic metal material. The film forming apparatus 2 is a single wafer processing type thermal CVD apparatus for, one by one, processing semiconductor wafers W, the film forming apparatus 2 having a processing container 4 made of, for example, aluminum. Moreover, the film forming apparatus 2 has an exhaust system 16 for exhausting gas in the processing container 4.

Since DMAH has a considerably high viscosity of 8,000 cp (centipoise) to 10,000 cp at room temperature and vigorously reacts with water and oxygen in the air and therefore fires and is rapidly decomposed at 100° C. or higher and thus precipitates metal aluminum as described above, it is heated to a predetermined temperature in a range (for example, 40° C. to 80° C.) in which the DMAH is not decomposed by heat, preferably to about 60° C. Then, the DMAH is smoothly supplied to the processing container 4. Specifically, an accommodation container 24 accommodating the DMAH 26 and the processing container 4 are connected to each other by a supply pipe passage 12. An end of the supply pipe passage 12 is immersed in the DMAH 26 stored in the accommodation container 24. At an intermediate position of the supply pipe passage 12, there are disposed a flow-rate control portion 28, such as a fluid mass-flow controller, and a vaporizer 30. An end of a pressure-supply pipe 3 is located above the fluid level of the DMAH 26. Another end of the pressure-supply pipe 3 is connected to an Ar cylinder (not shown) in which Ar gas (carrier gas) under pressure of, for example, about 3 kgf/cm$^2$ is enclosed. In the above-mentioned structure, the DMAH 26 in the accommodation container 24 is, by the Ar gas pressure, supplied to the supply pipe passage 12. The DMAH 26 is allowed to flow through the supply pipe passage 12 under the foregoing pressure such that the flow rate of the DMAH 26 is controlled by a flow-rate control portion 28 so as to be introduced into the vaporizer 30. The DMAH 26 introduced into the vaporizer 30 is, by high-pressure hydrogen gas supplied to the vaporizor 30, vaporized attributable to Joule and Thomson effects so that the DMAH 26 is formed into processing gas which is then introduced into the processing container 4.

The processing container 4 includes a frame 8 arranged to be heated by, for example, a resistance heater 6. The upper surface of the frame 8 is formed into a frame surface on which the wafer W is placed. In this case, the wafer W is held on the frame 8 by, for example, a mechanical clamp (not shown) or electrostatic chuck. A shower head 10 is disposed above the frame 8 to face the frame 8. The shower head 10 includes a diffusion plate 14 having a multiplicity of diffusion apertures. In order to introduce the gasified DMAH into the processing container 4 through the shower head 10, a supply pipe passage 12 is connected to the shower head 10.

An opening 20 for introducing and discharging the wafer W to and from the processing container 4 is formed in the side wall of the processing container 4. In order to enable wafer W to be introduced and discharged while maintaining the vacuum state in the processing container 4, the opening 20 is hermetically closed by a gate valve G1. A load lock chamber 21 is connected to the processing container 4 through the gate valve G1.

In order to reduce the pressure in the processing container 4 to a predetermined vacuum level, an exhaust port 18, to which an exhaust system 16 is connected, is formed in a bottom 4A of the processing container 4. The exhaust system 16 has an exhaust pipe passage 32 connected to the exhaust port 18 and made of, for example, stainless steel. An automatic pressure adjustment valve 34, a turbo molecular pump 36, an opening/closing valve 37, a dry pump 38 serving as a major pressure reduction pump, a deleterious-material removing means 40 and a water scrubber 42 are, in this sequential order, disposed at intermediate positions of the exhaust pipe passage 32.

FIG. 2 schematically shows an example of the turbo molecular pump 36. As shown in FIG. 2, the turbo molecular pump 36 has a cylindrical housing 44. A flange portion formed at the top end of the housing 44 is, through bolts 80, attached and secured to a corresponding flange portion of the automatic pressure adjustment valve 34. A cylindrical rotor 48 is disposed in the housing 44. A plurality of fixed blades 46 are disposed on the inner wall of the housing 44. A plurality of rotor blades 50 are disposed on the outer wall of the rotor 48 and positioned among the fixed blades 46. The lower end of the housing 44 is hermetically attached to a frame 56 by bolts 58. The central portion of the frame 56 forms a cylindrical bearing housing 60 standing from the foregoing central portion. The bearing housing 60 is disposed inward from the rotor 48 in a space S provided therebetween. The rotor 48 having the closed top end is directly or indirectly connected to a rotational shaft 54 which is driven by a rotational motor 52 and penetrates the bearing housing 60 so that the rotor 48 is able to be rotated. In this structure, the rotational shaft 54 is rotatively supported by a bearing 62 disposed between the rotational shaft 54 and the bearing housing 60. In order to permit rotation of the rotational shaft 54 while hermetically maintaining the inner portion of the turbo molecular pump 36, a lower opening of the bearing housing 60 through which the rotational shaft 54 is allowed to penetrate is sealed up by, for example, a magnetic fluid seal 64.

An inert-gas supply means 65 for introducing inert gas into the turbo molecular pump 36 is provided for the frame 56. The inert-gas supply means 65 has a gas nozzle 66 extending to penetrate the bearing housing 60 and opened at an inner portion of the bearing housing 60. The gas nozzle 66 is, through a gas supply pipe passage 70, connected to a $N_2$-gas source 68 in which inert gas, for example, $N_2$ gas, is stored. The inert gas is not limited to the $N_2$ gas. Other inert gas, such as Ar gas or He gas may be employed. The gas supply pipe passage 70 has an opening/closing valve 72 and a orifice 74 disposed at intermediate positions thereof. The inert-gas supply means 65 is not limited to the above-mentioned structure if it is able to supply the inert gas into the rotor 48.

An exhaust port 76 is formed in the side wall of the bottom portion of the housing 44. The exhaust port 76 is connected to the dry pump 38 through the exhaust pipe passage 32 connected to the flange 78 of the housing 44 forming an exhaust port 76.

FIG. 3 schematically shows an example of the dry pump 38. As shown in FIG. 3, the dry pump 38 has a housing 82 formed into, for example, a cylindrical shape. The housing 82 has a gas suction port 84 at an end in the lengthwise direction thereof and a gas discharge port 86 at another end thereof. The gas suction port 84 is connected to the turbo molecular pump 36 through the exhaust pipe passage 32, while the gas discharge port 86 is connected to a deleterious-material removing means 40 through the exhaust pipe passage 32. A multiplicity of pairs of rotational blades 88 and 90 which are rotated while being brought into contact with each other are disposed in the housing 82. The rotational blades 88 are supported by a rotational shaft 92, while rotational blades 90 are supported by a rotational shaft 94. That is, the dry pump 38 is in the form of a so-called roots type vacuum pump. Each of the rotational shafts 92 and 94 is rotatively supported by the housing 82 through a bearing 96 so as to be rotated by a rotational motor 98. In this case, the bearing portion of each of the rotational shafts 92 and 94 is sealed up by a magnetic liquid seal (not shown).

In order to prevent a fact that the overall body of the dry pump 38 is heated by compressive heat and frictional heat generated during the operation of the pump 38 and thus DMAH in the exhaust gas is decomposed, a cooling means 100 is provided for the dry pump 38. The cooling means 100 comprises a cooling passage (a cooling jacket) 101 formed spirally along the inner surface of the housing 82. In order to lower the temperature in the dry pump 38 to a level lower than the temperature at which DMAH is decomposed, a refrigerant, such as cooling water, is allowed to flow in the cooling passage 101. Therefore, DMAH allowed to flow through the dry pump 38 is not decomposed with heat but the same is discharged to the outside of the dry pump 38. The compression ratio in the downstream portion of the dry pump 38 is made to be higher than that in the upstream portion of the same and thus the temperature of the downstream portion tends to be raised. Therefore, the refrigerant is introduced into the cooling passage 101 from the downstream portion of the dry pump 38 toward the upstream portion. Accordingly, a refrigerant inlet port 102 is formed in the downstream portion of the dry pump 38, while a refrigerant outlet port 103 is formed in the upstream portion of the dry pump 38. Note that the structure of the cooling passage 101 is not limited to that shown in FIG. 3 if it is able to cool the dry pump 38.

FIG. 4 schematically shows an example of the deleterious-material removing means 40. As shown in FIG. 4, the deleterious-material removing means 40 has a housing 104 made of, for example, stainless steel and formed into a rectangular shape. The housing 104 has a gas introduction port 106 in either side wall thereof and a gas discharge port 108 formed in another side wall. The gas introduction port 106 is connected to the dry pump 38 through the exhaust pipe passage 32, while the gas discharge port 108 is connected to the water scrubber 42 through the exhaust pipe passage 32. A ceiling board 114 and a bottom plate 110 are detachably attached to the housing 104 by bolts 112 and 116.

The housing 104 includes a plurality of ceramic heater plates 118 serving as heating means. The heater plates 118 are, at a predetermined pitch, attached to a support column 120 connected to the ceiling board 114 and vertically extending in the housing 104. The above-mentioned structure enables the ceramic heater plate 118 to be removed from the housing 104 together with the support column 120 formed integrally with the ceiling board 114 by removing the ceiling board 114 from the housing 104. In order to cause the surface of the ceramic heater plate 118 to be brought into efficiently contact with the exhaust gas, each ceramic heater plate 118 is inclined with respect to a direction in which the exhaust gas flows. A dry air nozzle 122 for introducing dry air for use in combustion into the housing 104 is disposed in the upstream portion in the housing 104.

Figure 5:
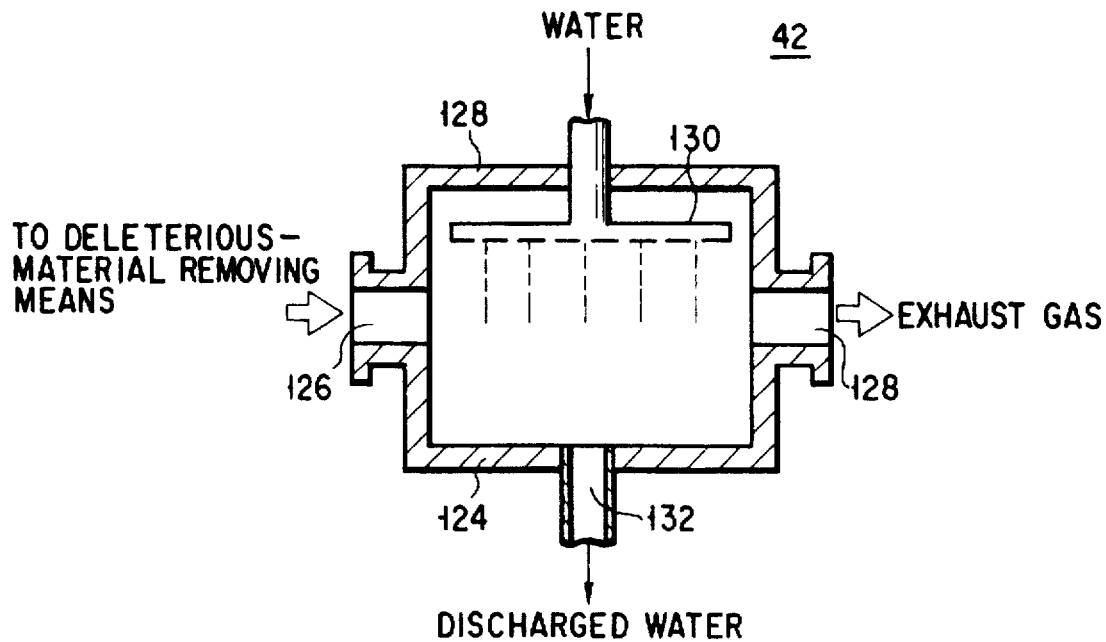
FIG. 5 is a cross sectional view schematically showing a water scrubber forming the exhaust system shown in FIG. 1.

FIG. 5 schematically shows an example of the water scrubber 42. As shown in FIG. 5, the water scrubber 42 has a housing 124 made of, for example, stainless steel and formed into a rectangular shape. The housing 124 has a gas introduction port 126 in either of the side walls thereof and a gas discharge port 128 formed in another side wall thereof. The gas introduction port 126 is connected to the deleterious-material removing means 40 through the exhaust pipe passage 32, while the gas discharge port 128 is connected to a duct in a plant through the exhaust pipe passage 32. A ceiling portion 128 of the housing 124 is provided with a shower head 130 for spraying water into the housing 124. A bottom portion 130 of the housing 124 has a water discharge port 132 for discharging water sprayed into the housing 124.

The turbo molecular pump 36, the deleterious-material removing means 40 and the dry pump 38 are not limited to the above-mentioned structure.

The operation of the film forming apparatus 2 having the above-mentioned structure will now be described.

Initially, the non-processed wafer W is introduced into the processing container 4. The wafer W introduced into the processing container 4 is placed on the frame 8 and held on the same. Then, each of the pumps 36 and 38 of the exhaust system 16 is operated so that the pressure in the processing container 4 is lowered to a level approximating the base pressure. At this time, the wafer W is heated by the resistance heater 6 so that the temperature of the wafer W is maintained at a processing temperature (a predetermined level in a range from about 160° C. to 300° C., for example, 200° C.).

Then, the vaporized DMAH gas is introduced into the processing container 4 through the shower head 10. Thus, the process for forming an aluminum film is performed in a state where the portion in the processing container 4 is maintained at a predetermined pressure level in the processing pressure range (for example, a range from 0.1 Torr to 20 Torr), for example, 2 Torr. At this time, non-reacted DMAH gas is contained in the exhaust gas, and then allowed to flow in the exhaust pipe passage 32 through the exhaust port 18 of the processing container 4. The exhaust gas containing the DMAH gas allowed to flow through the exhaust pipe passage 32 is allowed to pass through the turbo molecular pump 36 and the dry pump 38, and then removed by the deleterious-material removing means 40. The flow of the exhaust gas through the exhaust pipe passage 32 will now be described.

As shown in FIG. 2, the rotor blades 50 attached to the rotor 48 are rotated at high speed when the rotational motor 52 is rotated. Therefore, the degree of vacuum in the turbo molecular pump 36 is raised and the exhaust gas containing the DMAH gas allowed to flow into the turbo molecular pump 36 through the exhaust pipe passage 32 is discharged to the exhaust port 76. At this time, the exhaust gas tends to be, through gap S between the inner wall of the rotor 48 and the outer wall of the bearing housing 60, introduced into the bearing portion which has been relatively heated. Accordingly, the opening/closing valve 72 is arbitrarily controlled so that $N_2$ gas, employed as the inert gas, is supplied through the gas nozzle 66 of the inert-gas supply means 65 into the bearing housing 60 in an adequate quantity. Therefore, the pressure of the $N_2$ gas prevents unintentional introduction of the exhaust gas into the bearing housing 60. As a matter of course, the quantity of the $N_2$ gas to be supplied is determined to prevent a counter flow to the processing container 4 and to be capable of preventing introduction of the exhaust gas into the bearing housing 60. The quantity of the $N_2$ gas is determined in accordance with the quantity of displacement from the turbo molecular pump 36. If the displacement from the turbo molecular pump 36 is about 300 liters/second, the quantity of the $N_2$ gas is determined to be about 5 sccm to 15 sccm, preferably about 10 sccm.

Since the DMAH gas is not brought into contact with the heated bearing 62 in the turbo molecular pump 36 as described above, aluminum is not decomposed with heat and it is not brought into contact with the bearing 62 or the like.

Therefore, breakage of the turbo molecular pump 36 attributable to the precipitation of aluminum can be prevented.

The DMAH gas, which is not precipitated and which is discharged from the turbo molecular pump 36 together with the exhaust gas, is allowed to pass through the exhaust pipe passage 32, and then introduced into the dry pump 38.

In the dry pump 38, the multiple rotor blades 88 and 90 are, by the rotational motor 98, rotated while being brought into slidably contact with each other, as shown in FIG. 3. Therefore, the compression ratio of the exhaust gas sucked into the dry pump 38 through the gas suction port 84 is gradually raised as it flows toward the gas discharge port 86. As a result, the temperature in the dry pump 38 is raised in a direction toward the gas discharge port 86 also attributable to the frictional energy. Thus, the refrigerant is allowed to flow through the cooling passage 101 so that the temperature in the housing 82 is lowered. In order to improve the cooling efficiency, the refrigerant is introduced from the downstream portion, the temperature of which tends to be raised as compared with that of the upstream portion. A variety of materials, for example, ethylene glycol, can be employed as the refrigerant, as well as cooling water. The cooling temperature is determined to be included in a range in which the organic metal material is not decomposed with heat and the same is not precipitated attributable to super cooling. In the case where DMAH is employed according to this embodiment, the cooling temperature is determined to be included in a range from 30° C. to 60° C. Specifically, the refrigerant, the temperature of which is about 25° C. is allowed to flow through the cooling passage 101 so that the portion in the housing 82 is cooled to a temperature, for example, about 50° C., which is lower than the temperature at which the DMAH is decomposed (about 100° C.).

As described above, the temperature in the dry pump 38 is maintained at a level not higher than the temperature at which the DMAH gas is decomposed with heat. Therefore, the DMAH gas contained in the exhaust gas is not decomposed with heat and thus no metal aluminum is precipitated in the dry pump 38. As a result, adhesion of the metal aluminum to the dry pump 38, which causes the dry pump 38 to be broken, can be prevented.

The DMAH gas, which is not precipitated in the dry pump 38 and discharged from the dry pump 38 together with the exhaust gas, is allowed to pass through the exhaust pipe passage 32, and then introduced into the deleterious-material removing means 40.

As shown in FIG. 4, dry air is supplied into the housing 104 of the deleterious-material removing means 40 and thus the ceramic heater plate 118 is heated to a level not lower than a predetermined temperature so that non-reacted DMAH contained in the exhaust gas introduced into the housing 104 is burnt and removed. Specifically, the DMAH gas contained in the exhaust gas is burnt attributable to radiant heat from the ceramic heater plate 118 heated to, for example, about 500° C. and dry air introduced into the housing 104 from the upstream portion of the housing 104, through the dry air nozzle 122. A combustion product 146 of the burned DMAH gas falls to the bottom portion of the housing 104. The temperature of the ceramic heater plate 118 is not limited to 500° C. if the DMAH can be burned. The quantity of dry air to be supplied is determined to be capable of sufficiently burning the DMAH. Since the precipitated combustion product 146 is deposited on the bottom plate 110 in the housing 104, the combustion product 146 can periodically be removed by periodically removing the bottom plate 110 from the housing 104. By removing the ceiling board 114 from the housing 104 to remove the ceramic heater plate 118 integrated with the ceiling board 114 from the housing 104, maintenance of the ceramic heater plate 118 can be performed.

As described above, the deleterious-material removing means 40 is able to instantaneously burn and remove the non-reacted DMAH, which has not been decomposed with heat and which has been introduced into the housing 104 in the gaseous state.

Since the non-reacted DMAH can substantially completely be removed by the deleterious-material removing means 40, exhaust gas discharged from the deleterious-material removing means 40 can directly be emitted to the atmosphere through the duct in the plant without a fear of a problem. In order to realize more reliable safety, this embodiment has the structure such that the exhaust gas from the deleterious-material removing means 40 is introduced into the water scrubber 42 shown in FIG. 5. The water scrubber 42 also serve as a emergency deleterious-material removing means in a case where the deleterious-material removing means 40 is broken down and thus the DMAH cannot be removed by the deleterious-material removing means 40.

In the water scrubber 42, sprayed water and the exhaust gas are brought into contact with each other so that contents in the exhaust gas are adsorbed by sprayed water and removed. Specifically, water sprayed through the shower head 130 to the overall internal portion of the housing 124 is brought into contact with the exhaust gas introduced into the housing 124 so that floating dusts such as the combustion products contained in the exhaust gas are adsorbed by sprayed water and removed. The exhaust gas discharged from the water scrubber 42 is radiated to the atmosphere through the duct in the plant.

Since the deleterious-material removing means 40 is able to reliably remove floating dusts (for example, combustion products) in the exhaust gas as described above, clean exhaust gas can be radiated to the atmosphere. Even if the deleterious-material removing means 40 is broken down and thus the non-reacted DMAH cannot be removed by the deleterious-material removing means 40, the non-reacted DMAH can reliably be removed by the water scrubber 42. Therefore, the process can be performed safely even in the above-mentioned case. Since the water scrubber 42 can be used as an emergency means, also exhaust gas from another processing apparatus is commonly introduced into the water scrubber 42 though the structure is omitted from illustration.

As described above, the exhaust system 16 for the film forming apparatus according to this embodiment has the structure such that $N_2$ gas is supplied to the bearing portion of the turbo molecular pump 36, which can easily be heated excessively, to prevent precipitation of aluminum to the bearing portion. The dry pump 38, which can be heated excessively, is cooled by the cooling means 100 to prevent precipitation of aluminum in the dry pump 38. Moreover, non-reacted DMAH allowed to pass through the foregoing pumps 36 and 38 is instantaneously burned by the deleterious-material removing means 40 so as to be removed. Therefore, the turbo molecular pump 36 and the dry pump 38 can be protected from being damaged due to the precipitation of metal films. As a result, the process for forming aluminum films can be performed efficiently to perform mass production.

Results of experiments to compare the quantity of precipitated aluminum in the deleterious-material removing means 40 in a case where the dry pump 38 has been cooled by the cooling means 100 and that in the deleterious-material removing means 40 in a case where the dry pump 38 has not been cooled with each other are shown below. Note that the two case were performed under the same film forming conditions.

[Film Forming Condition]

1. DMAH was allowed to flow into the film forming apparatus 2 at a rate of 100 sccm (in terms of gas) in such a manner that $H_2$ gas was allowed to flow as carrier gas at a rate of 1000 sccm.

2. $N_2$ gas under pressure of 42.6 Pa was allowed to flow through the dry pump 38 at a rate of 6 liters/minute.

[Results]

In the case where the dry pump 38 was cooled
* Quantity of DMAH at Inlet Portion of Deleterious-material removing means 40:70.5 sccm
* Quantity of DMAH at Outlet Portion of Deleterious-material removing means: 0.1 sccm In the case where the dry pump 38 was not cooled
* Quantity of DMAH at Inlet Portion of Deleterious-material removing means 40:16.6 sccm
* Quantity of DMAH at Outlet Portion of Deleterious-material removing means: 0.1 sccm As can be understood from the results above, when the dry pump 38 was not cooled, a large quantity of aluminum was precipitated to the dry pump 38, thus resulting in the quantity of DMAH at the inlet portion of the deleterious-material removing means 40 being reduced considerably. On the other hand, when the dry pump 38 was cooled as was performed in this embodiment, precipitation of metal aluminum in the dry pump 38 was substantially prevented. Therefore, DMAH was introduced to the inlet portion of the deleterious-material removing means 40 in a large quantity of 70.5 sccm so that DMAH was efficiently removed by the deleterious-material removing means 40. If a dry pump 38 having a large displacement is employed, not only wafer W having a diameter of 200 mm (8 inches) but also wafer W having a large diameter of 300 mm (12 inches) requiring a large quantity of the processing gas can easily be formed.

Figure 6:
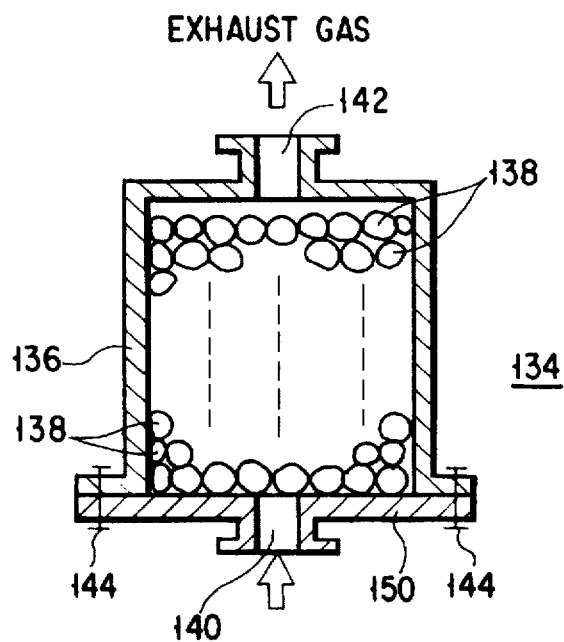
FIG. 6 is a cross sectional view schematically showing a modification of the deleterious-material removing means shown in FIG. 4.

FIG. 6 shows a modification of the deleterious-material removing means. The deleterious-material removing means 40 shown in FIG. 5 is adapted to a so-called heat oxidation decomposition removal method to remove non-reacted DMAH by heating and oxidizing. On the other hand, a deleterious-material removing means 134 shown in FIG. 6 is adapted to a so-called physicochemical adsorption removal method such that DMAH is adsorbed and removed by chemical reactions. Another method, such as a combustion removal method may be employed.

As shown in FIG. 6, a housing 136 of the deleterious-material removing means 134 accommodates a multiplicity of columns 138 having surfaces each of which is applied with a chemical containing, for example, copper hydroxide (Cu$(OH)_2$), which reacts with DMAH. The housing 136 has a bottom portion 150 provided with a gas introduction port 140 and a ceiling portion provided with a gas discharge port 142. The gas introduction port 140 is connected to the dry pump 38 through the exhaust pipe passage 32, while the gas discharge port 142 is connected to the water scrubber 42 through the exhaust pipe passage 32. Note that change of the column 138 to a new column is permitted by detachably attaching the bottom portion 150 to the housing 136 with bolts 144.

In the above-mentioned structure, non-reacted DMAH contained in the exhaust gas reacts with the chemical applied to the surface of each of the columns 138 in accordance with the following reaction formula so as to be adsorbed and removed by the columns 138.

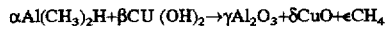

where $\alpha$, $\beta$, $\gamma$, $\delta$ and $\epsilon$ are integers.

Although the description of the foregoing embodiment has been made about the case where DMAH is employed as the organic metal material, the organic metal material is not limited to this. For example, TIBA (triisobutyl aluminum), DMEAA (dimethylethylaminoallan), TMEAA (trimethylaminoallan), TMA (trimethylaluminum), TMG (trimethylgallium) or trialkylhosphine may be employed to attain similar effect. As a matter of course, the foregoing embodiment is not limited to the semiconductor wafer. The embodiment may be applied to another object to be processed, for example, it may be applied to a process for forming a film on an LCD substrate or a glass substrate.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. An exhaust system for a film forming apparatus comprising:

an exhaust pipe passage connected to an exhaust port of said film forming apparatus for forming a film on a object by using vaporized gas of an organic metal compound;

pressure transfer means provided for said exhaust pipe passage and arranged to transfer, through said exhaust pipe passage, gas in said film forming apparatus as exhaust gas;

cooling means provided for said pressure transfer means and arranged to cool said pressure transfer means to a temperature lower than a temperature, at which the organic metal compound is decomposed, so as to prevent precipitation of the organic metal compound contained in the exhaust gas introduced into said pressure transfer means; and deleterious-material removing means disposed at an intermediate position of said exhaust pipe passage downstream from said pressure transfer means so as to remove the organic metal compound contained in the exhaust gas which is introduced through said exhaust pipe passage.

2. An exhaust system for a film forming apparatus according to claim 1, wherein said deleterious-material removing means removes the organic metal compound in the exhaust gas by burning the organic metal compound.

3. An exhaust system for a film forming apparatus according to claim 2, wherein said deleterious-material removing means has a housing into which the exhaust gas is introduced through said exhaust pipe passage, dry air supply means for supplying dry air into said housing and a ceramic heater plate disposed in said housing to use radiant heat from said ceramic heater plate and dry air to burn and remove the organic metal compound in the exhaust gas introduced into said housing.

4. An exhaust system for a film forming apparatus according to claim 1, wherein said deleterious-material removing means causes the organic metal compound in the exhaust gas to perform chemical reactions so that the organic metal compound is removed.

5. An exhaust system for a film forming apparatus according to claim 1, wherein said pressure transfer means is a vacuum pump having a structure such that a pair of rotors are rotated while being brought into contact with each other so as to transfer the exhaust gas with pressure.

6. An exhaust system for a film forming apparatus according to claim 5, wherein said cooling means has a cooling pipe passage extending from an upstream position of said pressure transfer means to a downstream position, and a refrigerant is supplied from a downstream position of said pressure transfer means, at which the compression ratio of the exhaust gas is raised, into said cooling pipe passage.

7. An exhaust system for a film forming apparatus according to claim 1, further comprising:

a water scrubber disposed at an intermediate position of said exhaust pipe passage downstream from said deleterious-material removing means to remove contents in said exhaust gas by bringing water into contact with the exhaust gas.

8. An exhaust system for a film forming apparatus according to claim 1, wherein the organic metal compound is a material selected from the group consisting of DMAH (dimethylaluminum hydride), TIBA (triisobutyl aluminum), DMEAA (dimethylethylaminoallan), TMEAA (trimethylaminoallan), TMA (trimethylaluminum), TMG (trimethylgallium) or trialkylhosphine.

9. An exhaust system for a film forming apparatus comprising:

an exhaust pipe passage connected to an exhaust port of said film forming apparatus for forming a film on a object by using vaporized gas of an organic metal compound;

first pressure transfer means provided for said exhaust pipe passage and arranged to suck gas in said film forming apparatus to transfer the gas through said exhaust pipe passage with pressure;

second pressure transfer means disposed at an intermediate position of said exhaust pipe passage downstream from said first pressure transfer means to transfer the exhaust gas discharged from said first pressure transfer means through said exhaust pipe passage with pressure;

inert gas supply means arranged to supply inert gas to said first pressure transfer means so as to use supply pressure of the inert gas to prevent introduction of suction gas from said film forming apparatus into the portion of said first pressure transfer means, the temperature of which is raised to a level not lower than the temperature at which the organic metal compound is decomposed;

cooling means provided for said second pressure transfer means and arranged to cool said second pressure transfer means to a temperature lower than a temperature, at which the organic metal compound is decomposed, so as to prevent precipitation of the organic metal compound contained in the exhaust gas introduced into said second pressure transfer means; and deleterious-material removing means disposed at an intermediate position of said exhaust pipe passage downstream from said second pressure transfer means so as to remove the organic metal compound contained in the exhaust gas which is introduced through said exhaust pipe passage.

10. An exhaust system for a film forming apparatus according to claim 9, wherein said deleterious-material removing means removes the organic metal compound in the exhaust gas by burning the organic metal compound.

11. An exhaust system for a film forming apparatus according to claim 10, wherein said deleterious-material removing means has a housing into which the exhaust gas is introduced through said exhaust pipe passage, dry air supply means for supplying dry air into said housing and a ceramic heater plate disposed in said housing to use radiant heat from said ceramic heater plate and dry air to burn and remove the organic metal compound in the exhaust gas introduced into said housing.

12. An exhaust system for a film forming apparatus according to claim 9, wherein said deleterious-material removing means causes the organic metal compound in the exhaust gas to perform chemical reaction so that the organic metal compound is removed.

13. An exhaust system for a film forming apparatus according to claim 9, wherein said second pressure transfer means is a vacuum pump having a structure such that a pair of rotors are rotated while being brought into contact with each other so as to transfer the exhaust gas with pressure.

14. An exhaust system for a film forming apparatus according to claim 13, wherein said cooling means has a cooling pipe passage extending from an upstream position of said second pressure transfer means to a downstream position, and a refrigerant is supplied from a downstream position of said second pressure transfer means, at which the compression ratio of the exhaust gas is raised, into said cooling pipe passage.

15. An exhaust system for a film forming apparatus according to claim 9, further comprising:

a water scrubber disposed at an intermediate position of said exhaust pipe passage downstream from said deleterious-material removing means to remove contents in said exhaust gas by bringing water into contact with the exhaust gas.

16. An exhaust system for a film forming apparatus according to claim 9, wherein the organic metal compound is a material selected from the group consisting of DMAH (dimethylaluminum hydride), TIBA (triisobutyl aluminum), DMEAA (dimethylethylaminoallan), TMEAA (trimethylaminoallan), TMA (trimethylaluminum), TMG (trimethylgallium) or trialkylhosphine.

17. An exhaust system for a film forming apparatus according to claim 9, wherein said first pressure transfer means is a turbo molecular pump having a multiplicity of rotor blades therein, and said inert gas supply means supplies inert gas to a bearing portion for a rotational shaft for rotating the rotor blades.

18. A method of exhausting gas in a film forming apparatus comprising the steps of:

sucking gas containing organic metal compounds from said film forming apparatus;

allowing the gas to flow to a deleterious-material removing means through an exhaust pipe passage while preventing precipitation of the organic metal compound in the gas; and causing said deleterious-material removing means to remove the organic metal compound contained in the gas.

* * * * *